ptinstants
United States Patent
Yamazaki et al.

[15] 3,652,133
[45] Mar. 28, 1972

[54] BRAKE CONTROL DEVICE

[72] Inventors: Toshio Yamazaki; Takao Abu; Takefumi Sato, all of Osaka-shi; Koji Nishida; Tosiaki Okamoto, both of Kariya-shi, all of Japan

[73] Assignees: Hayakawa Denki Kogyo Kabushiki Kaisha, Osaka-shi; Aisin Seiki Kabushiki Kaisha, Kariya-shi, Japan

[22] Filed: June 3, 1969

[21] Appl. No.: 829,948

[30] Foreign Application Priority Data

June 5, 1968  Japan..................................43/38547
Sept. 11, 1968  Japan..................................43/65352

[52] U.S. Cl.........................303/21 CG, 188/181 A, 303/20
[51] Int. Cl........................................................B60t 8/12
[58] Field of Search..............188/181 A, 181 C; 303/21, 20; 307/121; 324/162; 340/262

[56] References Cited

UNITED STATES PATENTS 3,545,817  12/1970  Yarber..................................303/21 P
3,511,542  5/1970  Fielek, Jr...........................188/181 A Primary Examiner—Milton Buchler
Assistant Examiner—Stephen G. Kunin
Attorney—Holman & Stern

[57] ABSTRACT

An improved brake control device in a brake system of the type in which decrease in the speed of wheels due to braking force applied to them is converted into an electrical signal which activates brake release means when its value exceeds a preset reference value and is detected thereby to remove the braking force for a suitable time, after which the braking force is again applied, the braking of the wheels being accomplished by a cyclic repetition of this braking and releasing action, the brake control device having means for lowering the reference value after receiving the electrical signal corresponding to the initial speed decrease of the wheels thereby to cause the system to operate thereafter on the basis of the reference value thus lowered.

7 Claims, 8 Drawing Figures

INVENTORS
TOSHIO YAMAZAKI ET AL

BY Holman, Glascock, Downing & Seebold

ATTORNEYS

FIG. I(B)
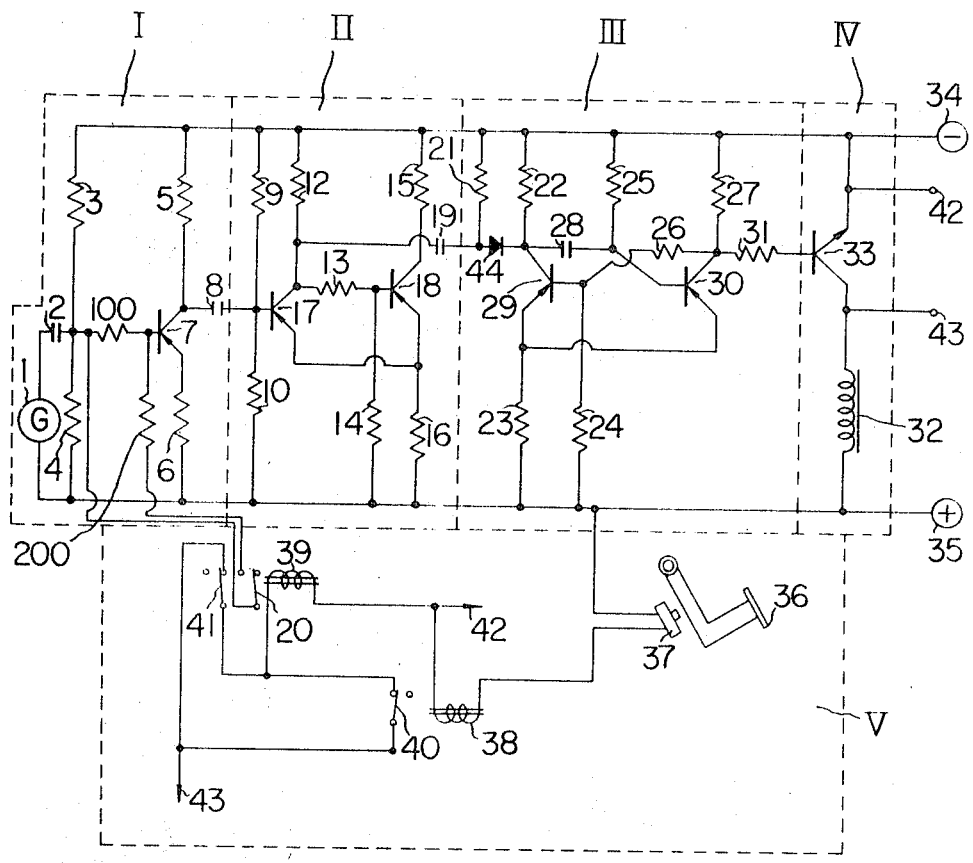

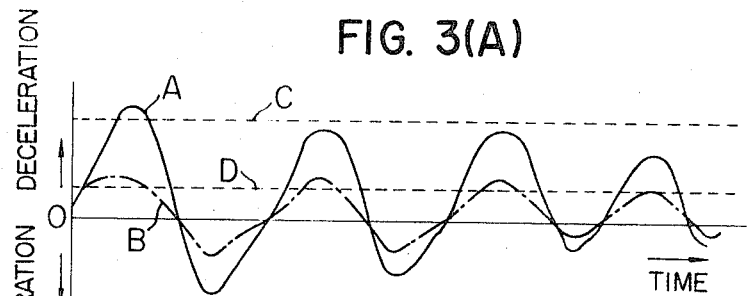
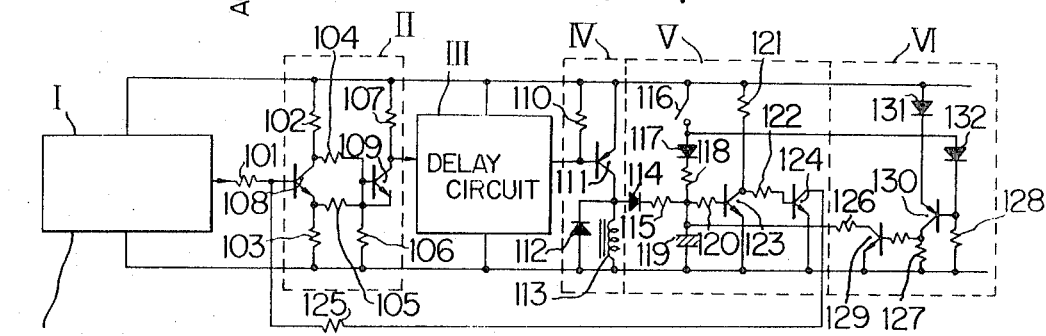
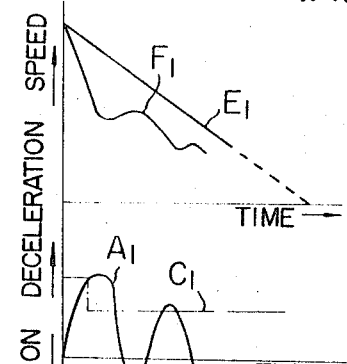
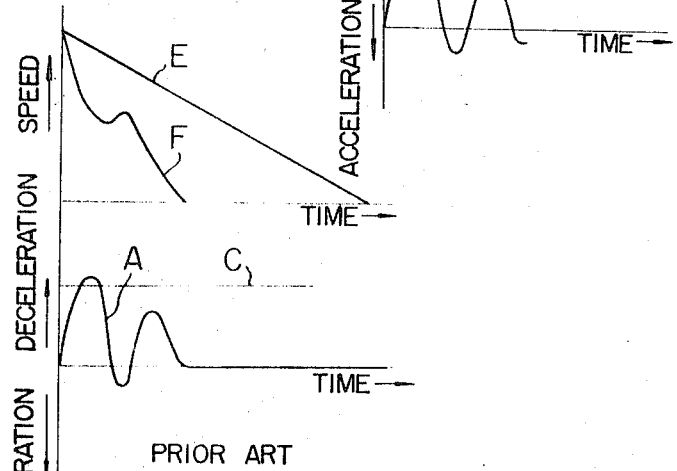

BRAKE CONTROL DEVICE

BACKGROUND OF THE INVENTION

This invention relates to an improved brake control systems for automobiles.

In general, in vehicles such as automobiles running at high speeds or on a track or runway causing readily wheel skidding, when an excessive braking effort is applied on the braking system of said vehicles by a rapid braking operation, the corresponding wheels are locked fully thereby, these wheels entering into such motions as slipping or particularly skidding as they are locked without rotating on the surface of the track, thereby to render difficult the control of the advancing direction of the vehicle and to lengthen the distance necessary for stopping thereof, with various accompanying accidents or dangers such as overturning.

Thus, in order to eliminate these disadvantages, the construction of the heretofore known brake-controlling system for automobiles is such that, when rotation of wheels of the vehicle is decelerated by braking operation, the rate of deceleration of these wheels is converted into electrical signal and when the value of this signal is detected exceeding a certain set level, the wheels are relieved for a suitable period of the braking effort by operating a releasing means thereby to put the wheels into rotation, and upon the rotation thereof, braking effort is again applied thereon. By repeating such a cycle of braking and relieving of wheels, the vehicle can be stopped without accompanying skidding.

However, in the above described brake-controlling system for automobiles, since the set level compared with rate of deceleration of wheels is always constant, when the value of set level is low, the brake-controlling system operates even for a loose braking operation such as to show substantially no danger of skidding and even for other operations than braking such as operation of speed-change clutch system, with undesirably long stopping distance and with erroneous operations. More specifically, when braking effort is applied on wheels simultaneously with clutch operation, outer disturbances caused by the clutch operation and deceleration of the wheels overlap each other in some cases. Such overlapping effects may be detected by the brake control system even when there is no danger as described above. On the other hand, in the case when the value of set level value is high, a large deceleration signal is obtained at the moment when a rapid braking effort is applied on wheels. Consequently, the brake control system enters into operation to release the braking effort on the wheels. However, when wheels are locked even by a loose braking effort, the rate of deceleration caused in the wheels is low. Therefore, this deceleration may not be detected sometimes by using the above described high set level. Consequently, there occurs no signal for releasing the braking effort, the wheel being thus held in braked state, and the desired object of preventing skidding can not be fully attained.

In general, it is well known that, by applying a braking effort such that revolutions of wheels become those corresponding to the order of 80 percent of velocity of the vehicle, skidding thereof is prevented and braking distance is shortened.

Now, it is presumed that the set level is fixed in advance in such a manner to generate a releasing signal immediately before locking of wheels in the case when the wheels are locked even by a loose braking effort. The rate of deceleration of wheels will becomes large for such a set level when a rapid braking effort is applied, and the deceleration will be detected before revolutions of the wheels reach the value corresponding to 80 percent of the velocity of the above described vehicle, braking distance being thus lengthened.

Therefore, it is necessary to hold the set level of electric signal at a high value at the beginning of braking operation. However, if the set level of electric signal is left at a high value in the period from braking operation to stoppage of vehicle, rate of deceleration of wheels will not cause electric signal to reach the set level when a loose braking effort is applied on wheels as described above, thereby to cause the wheels to enter into locked state.

Under these conditions, if it is presumed that adhesion coefficient between running track and wheels is constant when an effective and loose braking effort is applied on wheels, since the time necessary for revolutions of wheels to reach the value corresponding to 80 percent of velocity of vehicle is proportional to the velocity of vehicles at the moment of braking operation, an ideal brake control operation becomes possible by lowering the set level of electric signal after a relatively long period for a high velocity of vehicle at the moment of braking operation and after a relatively short period for a low velocity of vehicle at the braking moment.

As the system for varying the preset reference level adapted to detect the decelerating signal, there are the following systems.

1. A system including a resistor adapted to vary bias potential of base and emitter of the transistor corresponding to the transistor 17 as will be described later in connection with FIG. 1(A).
2. A system including means for varying amplitude of the output of the circuit I as will be described later in connection with FIG. 1(B).

The relationship between rate of deceleration and braking time period in the heretofore known brake control system for automobiles having disadvantages as described above is shown in FIG. 3 (A) and (B), wherein curved line A shows the state corresponding to a rapid braking operation, curved line B corresponds to a slow braking operation, and straight lines C and D show respectively set levels of electric signal, and wherein releasing of brakes occurs only in areas where the curved lines A and B exceed the straight line C or D. Further, in FIG. 3(B), curved line A and straight line C show the same characteristics as those of A and C of Fig. 3(A), straight line E shows characteristic of vehicle velocity, and curved line F shows characteristic of revolutions of wheels.

SUMMARY OF THE INVENTION

Accordingly, an object of this invention is to provide a brake control device which operates without the above described disadvantages of the heretofore known brake control devices, that is, which is in inoperative under slow braking operation when a skid condition is not eminent, and which operates so as to prevent skidding until stoppage of vehicle only when braking effort applied on the wheels is abnormally larger than the braking force of the track on which the vehicle runs.

The forgoing essential object and other objects as well as detailed features of the invention will become more apparent and more readily understandable from the following description when read in conjunction with the accompanying drawings.

BRIEF DESCRIPTION OF THE DRAWINGS

Fig. 1(B) shows an electric circuit diagram of modification of the example of Fig. 1;

Fig. 3 shows characteristics of the heretofore known brake control device, Fig. 3(A) showing particularly relative characteristics between deceleration, acceleration and braking time and Fig. 3(B) showing a characteristic diagram as in (A) and a diagram corresponding thereto with respect to relation between vehicle velocity, wheel velocity and braking time;

Fig. 4 is an electric circuit diagram showing another embodiment of the invention; and Fig. 5 shows characteristic diagrams of deceleration, acceleration and braking time on the one hand and those of vehicle velocity, wheel velocity and braking time on the other hand when using the control circuit according to the invention.

Figure 1A:
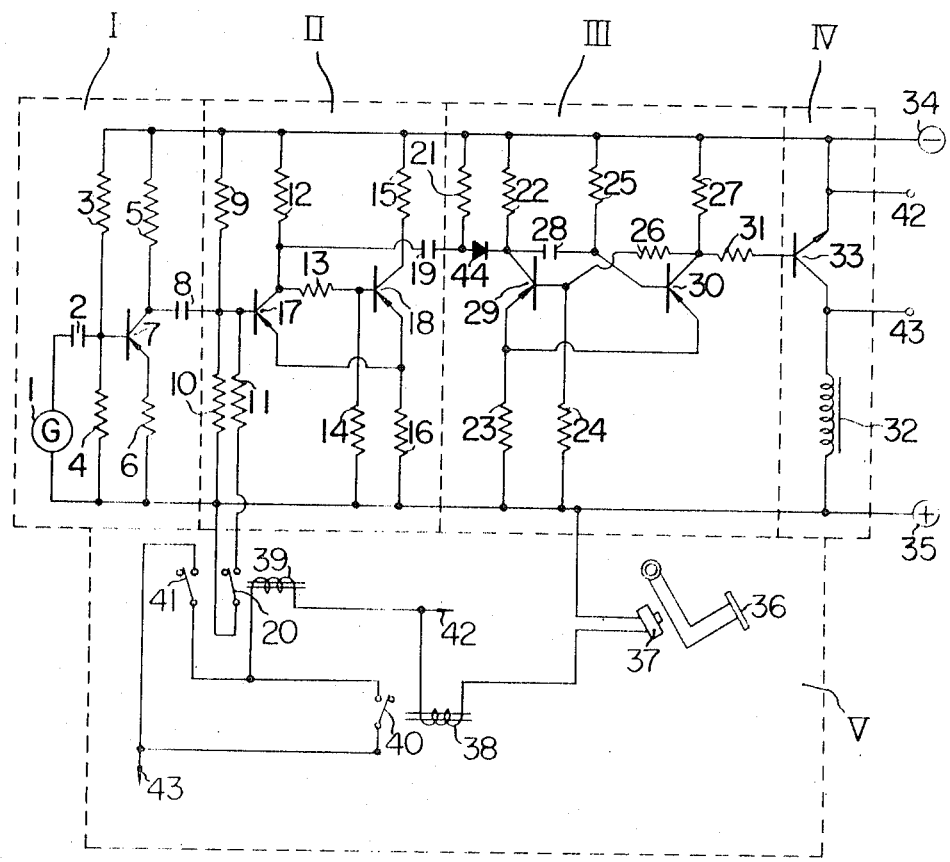
Fig. 1(A) shows an electric circuit diagram of one example of this invention.

Further, in each figure, the corresponding portions are designated by the same marks.

DETAILED DESCRIPTION OF THE INVENTION

This invention is described firstly with reference to the embodiment shown in Fig. 1. The electric circuit of Fig. 1 consists of five sections of I,II,III,IV and V which correspond, respectively, to detection-amplification circuit, reference level setting circuit Schmitt circuit), delay circuit (single-stability multivibrator), brake releasing circuit, and automatic switching circuit.

Section 1 of the electric circuit comprises a deceleration signal generator 1 for detecting the rate of deceleration at the moment of braking operation on the wheels and for generating an electric signal corresponding thereto and an amplifying device consisting of a capacitor 2, resistances 3,4,5,6 and a transistor 7, thereby to amplify signals generated by said deceleration-signal generator 1 to deliver the amplified signals to the following section II through a coupling capacitor 8. Section II is a Schmitt circuit comprising resistances 9,10,11,12,13,14,15 16 and two transistors 17, 18 coupled by said resistance 12, and operates for fixing respective set levels of electric signal. More specifically, when an input larger than a set level fixed by the resistances 10, 11 is applied from the section I, this section II generates a certain output and delivers a signal through a capacitor 19 into the following section III. In the section II, the transistor 17 is held normally non-conductive and the transistor 18 is maintained in a conductive state. When a deceleration signal exceeding the set level is being applied on the transistor 17, this transistor 17 becomes conductive, and this signal is transmitted from collector side of the transistor 17 through the coupling capacitor 19 into the section III. The set level for the transistor 17 is determined by the resistances 10, 11, wherein the resistance 11 is connected in parallel with the resistance 10 by the intermediary of a switch 20. When said two resistances are connected with each other in parallel, the set level is determined higher, and when the resistance 11 is decoupled to leave only the resistance 10, the set level is determined lower. Section III is a delay circuit consisting of single-stability multivibrator comprising resistances 21,22,23,24,25,26,27, a capacitor 28 and two transistors 29, 30. This section III operates so as to convert a signal from the section II into a pulse signal of a certain time period determined by the capacitor 28 and the resistance 25 and transmit this puls signal through a resistance 31 to the following section IV. Further, 44 designates a diode. Section IV is a releasing circuit consisting of a transistor 33 collector circuit of which comprises a magnetic coil 32. While a signal is being introduced from the section III, the transistor 33 is kept conductive thereby to energize the magnetic coil 32.

When energized, this magnetic coil causes a releasing means for releasing the excessive breaking effort applied on wheels to be operated by means of electromagnetic force or vacuum pressure.

The aforementioned sections I to IV are connected to and supplied with electric energy DC power source through terminals 34,35.

Section V is an automatic switching circuit consisting of a switch 37 to be closed upon pushing a brake-pedal 36, relay coils 38, 39 switch 20, and two switches 40, 41. A series circuit comprising the witch 37 and relay coil 38 is inserted between the terminal 35 and emitter terminal 43 of the transistor 33 of the section IV, and another series circuit comprising a relay coil 39 and a switch 41 is inserted between emitter 42 and collector terminal 43 of the transistor 33. Further, the switch 40 is connected in parallel with the switch 41, and the switch 20 and switch 41 are closed upon energizing the relay coil 39, while the switch 40 is opened upon energizing the relay coil 38.

The device according to the invention as described above operates as described below.

For the first place, when the brake-pedal 36 is held released, the switch 37 is opened to deenergize the relay coil 38, whereby the switch 40 is closed to connect the relay coil 39 and the magnetic coil 32 in series. In addition thereto, since no deceleration signal is not caused from the deceleration-signal generator 1, the transistor 33 is kept in non-conductive state. Consequently, a sufficient voltage is applied on the relay coil 39 thereby to close the switches 20 and 41. When the switch 20 is closed, the resistances 10, 11 are connected with each other in parallel, whereby said set level determined by the transistor 17 is raised. At the same time, a current flows through the magnetic coil 32. However, since the relay coil 39 has a sufficient larger resistance value than that of the magnetic coil 32, voltage between two terminals of the magnetic coil 32 has a small value so that the brake-releasing means does not operate.

In the next place, when the brake-pedal 36 is pushed for braking operation, the switch 37 is closed to energize the relay coil 38 thereby to open the switch 40. However, the switches 20,41 are self-retained at place by the relay coil 39 thereby to hold the parallel circuit comprising the resistances 10, 11. The braking operation on wheels causes the deceleration-signal signal generator 1 to generate a deceleration-signal, which is amplified by the transistor 7 to be transmitted to the section II. For a slow braking operation, a low signal is generated and the Schmitt circuit of the section II does not operate. On the other hand, for a rapid and momentary braking operation, there is a high deceleration signal, which exceeds the set level predetermined by the resistances 10,11 thereby to cause the Schmitt circuit to operate, a signal for releasing brakes being thus transmitted to the following section III. This transmitted signal is delayed into pulses of a certain time period in this section III, and these pulses are applied into the section IV to render the transistor 33 conductive. When the transistor 33 is conductive, a large electric current flows through the magnetic coil 32 thereby to release the brake-releasing means. While said signal is being afforded, brakes of wheels are thus released, and at the same time the conductive state of the transistor 33 nullifies the potential between the emitter terminal 42 and the collector terminal 43, thereby to deenergize the relay coil 39. Consequently, the switches 41, 20 are opened, whereby the set level of the section II becomes determined only by the resistance 10 thereby to be lowered. Thereafter, since the switch 40 is held opened while the brake-pedal 36 is being pushed, the switches 41, 20 will not be closed, whereby the set level in the section II is always determined only by the resistance 10 at a lower value. Then, when the releasing signal is nullified, braking effort is again applied on wheels, whereby a deceleration-signal is generated in the deceleration-signal generator 1 of the section 1 and the following sections II,III,IV are successively operated thereby to release again the braking effort. At this second releasing operation and later, since the set level of the section II is held at a low value, even a low deceleration-signal can work sufficiently. Thus, the cycle of braking and releasing thereof is repeated until stoppage of the vehicle.

Figure 2:
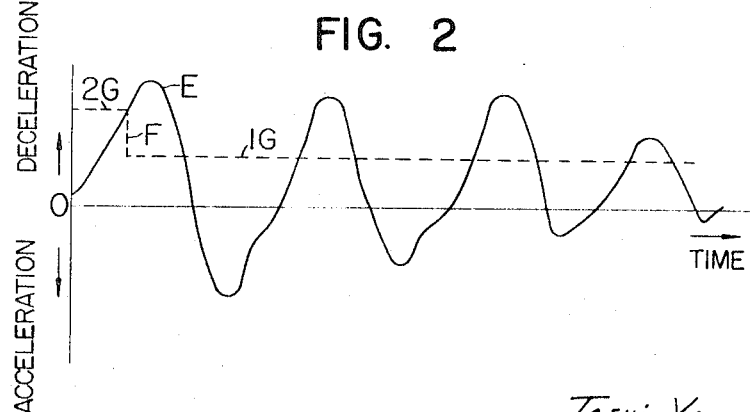
Fig. 2 is a schematic diagram showing the characteristic of relation between rates of deceleration and acceleration and braking time in the case where the device according to the invention is used.

Relation in time between this deceleration signal and set level of electric signal is shown in Fig. 2 in which E designates curve of deceleration of signal and F the set level of electric signal respectively.

Upon releasing the pushing operation of the brake-pedal 36 when the vehicle stops, the switch 37 is opened thereby to deenergize the relay coil 38 and close the switch 40. In this case, since the transistor 33 is in the non-conductive state in the section IV, the relay coil 39 is energized to close the switch 41, 20 thereby to form a parallel circuit comprising the resistances 10,11, the set level of electric signal in the section II being thus determined at a high value for the following operation cycle of the device.

A system for varying essentially the preset reference level adapted to detect decelerating signal by means of varying amplitude of the decelerating signal voltage will be described in connection with the example shown in Fig. 1(B). The example of Fig. 1(B) differs from the example of Fig. 1(A) in only the circuit sections I and V. Referring to circuit of Fig. 1(B), a resistance 100 and a switch 20 connected in parallel to said resistance 100 through a resistance 200 and capable of being opened upon energization of a relay 39 are inserted in the circuit between a condenser 2 and base of a transistor 7, whereby a resistor corresponding to the resistor 11 in the example of Fig. 1(A) is omitted.

Operation of the circuit illustrated in Fig. 1(B) will be described as follows, while omitting the operation common to that of the example of Fig. 1(A). In the circuit of Fig. 1(B), when any decelerating signal does not reach the preset reference level adapted to detect said signal, the relay 39 is energized and the switch 20 is in opened state as shown in Fig. 1(B). However, upon reaching of the signal to the preset reference level, the switch 20 is closed, whereby the resistance 200 is connected in parallel to the resistor 100 and the resistance between the condenser 2 and the base of the transistor 7 is decreased, thus causing application of a voltage larger than that in the case of opening of the switch 20 to the collector of the transistor 7. This condition will be described by adopting predical numeral values. If let it be assumed that for example, a voltage of 0.05 v. is generated in the decelerating signal generating device 1, voltage variation of 1 v. is generated in the collector of the transistor 7 in the case of opening of the switch 20, but when the switch 20 is closed, voltage variation of 2 v. is generated at the collector of the transistor 7.

As described above, according to the invention, the set level for detecting deceleration-signal is high at the first stage of braking operation, and once the deceleration signal is detected and releasing has been carried out, the set level of electric signal is lowered. Thereafter, even a small deceleration-signal can be detected for releasing operation. Accordingly, in the device according to the invention, when a slow braking operation is carried out firstly, the releasing means does not operate, whereby a usual braking operation can be carried out smoothly, and only for a rapid and momentary braking operation, the releasing means is caused to positively operate until the vehicle has been perfectly stopped, thereby to prevent skidding of vehicle. Thus the invention eliminates the disadvantages encounted in the heretofore known devices in order to attain the desired purposes.

Fig. 4 shows another embodiment of the invention. Section 1 shown in Fig. 4 is the same as section 1 of Fig., i.e. a detection-amplification circuit for detecting deceleration of wheels, generating an electric signal corresponding to the magnitude of the deceleration and amplifying the generated deceleration-signal which is then transmitted through a resistance 101 into a level setting circuit II.

The level setting circuit II is a Schmitt circuit consisting of resistances 102, 103, 104, 105, 106, 107 and transistors 108, 109. This circuit II takes out only the deceleration-signals which exceed a set level determined by circuit-parts constant therein and transmits these taken-out signals into the following delay circuit III. This delay circuit III converts the signals taken out in the setting circuit II into releasing signals having a certain time width.

Circuit IV is a brake releasing circuit for releasing brakes in response to the releasing signals from the delay circuit III for the time period corresponding to the time width of said releasing signals, and consists of a resistance 110, a transistor III, a diode 112 and a magnetic coil 113. The delay circuit III generates a switching signal on both terminals of the magnetic coil 113 upon receiving a relieving signal. This generated switching signal is transmitted to the following automatic switching circuit V.

The switching circuit V comprises a capacitor 119, resistances 120, 121, 122 and transistors 123, 124, said capacitor 119 being charged both through a diode 114, a resistance 115 upon receiving a switching signal and through a switch 116 to be closed upon pushing on brake-pedal, a diode 117 and a resistance 118. When the capacitor 119 is not charged, that is, when there is no switching signal from the delay circuit IV and the switch 116 is not opened, the transistor 123 is in the non-conductive state and the transistor 124 is in the conductive state. When a switching signal enters into the switching circuit V, the transistor 123 becomes conductive and the transistor 124 becomes non-conductive in the contrary way. Collector terminal of the transistor 124 is connected through a resistance 125 to the connection point between base terminal of the transistor 108 and resistance 101. In this case, the resistances 101 and 125 constitute together one portion of the switching circuit V. More specifically, when the transistor 124 is conductive, a deceleration signal from the circuit I enters into the settling circuit II after being voltage-divided by resistances the 101, 125 of said switching circuit V. On the other hand, when the transistor 124 is non-conductive, said deceleration signal enters as it is into the circuit II without being voltage-divided. Consequently, even though the set level of the settling circuit II is constant actually, it is subject to substantial modification in relative connection with magnitude of deceleration signal in accordance with conductive or non-conductive state of the transistor 124.

Further, the time-constant in charging determined by the resistance 115 and the capacitor 119 is predetermined sufficiently shorter than that predetermined by the resistance 120 and capacitor 119.

Circuit VI is a resetting circuit for resetting the switching circuit V into its original state and consists of resistances 126, 127, 128, transistors 129, 130 and diodes 131, 132. Since the switch 116 is open when brake-pedal is not pushed, both transistors 129, 130 are conductive. On the contrary, when brake-pedal is pushed, the switch 116 is closed and both transistors 129 and 130 are non-conductive. In this case, since the capacitor 119 in said switching circuit V is connected to collector terminal of the transistor 129, this capacitor 119 is discharged through the transistor 129 in the conductive state of the transistors 129, 130.

The example shown in Fig. 4 operates as described below.

In the first place, when brake-pedal is released, no deceleration-signal is generated in the detection circuit 1. Consequently, neither releasing signal nor switching signal is generated. Further, since the switch 116 is open, the transistors 129, 130 are in conductive state, thereby to discharge completely the discharge in the capacitor 119. At the same time, the transistor 124 is in conductive state and the transistor 123 is in non-conductive state, whereby a voltage-dividing circuit is formed by the transistors 101, 125.

In the second place, when brake-pedal is pushed for braking operation, the switch 116 is closed thereby to render the transistors 129, 130 non-conductive while simultaneously beginning to charge the capacitor 119 through the diode 117 and resistance 118.

On the other hand, deceleration-signal is generated in the detection circuit 1 by the above braking operation, said deceleration-signal being then voltage-divided by the resistances 101, 125 to be transmitted to the settling circuit II. When this voltage-divided deceleration-signal is so small as to be below the set level, the settling circuit II does not operate. If braking operation is carried out momentarily and rapidly, value of the voltage-divided deceleration-signal becomes large to exceed the set level thereby to cause the settling circuit II to operate. Signal taken out from the circuit II is transmitted to the following delay circuit III, wherein this signal is converted into releasing signals having a certain time width. This releasing signal enters into the releasing circuit IV to release brake system during the time length corresponding to said time width. When brake system has been released, wheels are again accelerated by the inertia of vehicle.

When a releasing signal enters into the releasing circuit IV, a generated switching signal charges the capacitor 119 through the diode 114 and resistance 115 within a short time period. When potential of the capacitor 119 has been raised, electric charge thereof begins to discharge slowly through the resistance 120 and transistor 123. While the transistor 123 becomes thus conductive, the transistor 124 becomes non-conductive thereby to eliminate the resistance 125 from said voltage-dividing circuit formed by the resistance 101 and 125.

Then, when the releasing signal is interrupted after a time period corresponding to said time width of releasing signal has elapsed, releasing of braking operation is stopped thereby to apply again braking effort on wheels, and a deceleration signal is again generated in the detecting circuit. This deceleration signal is smaller than that at the first braking operation. However, this second deceleration signal is transmitted as it is through the resistance 101 into the following settling circuit II without being voltage-divided in this case, and again releases brake system in the same manner as described above. It means that the set level of electric signal is substantially decreased in this case in relation to the case of the first deceleration-signal subjected to voltage-dividing. By repeating the cycle of braking and releasing thereof thereafter, the vehicle comes to stop.

The state in the above described braking operation is clearly understandable from graphical representations of Fig. 5(A), wherein curve $E_1$ shows variation of vehicle velocity, curve $F_1$ that of wheel velocity, curve $A_1$ deceleration and acceleration of wheels, and curve $C_1$ variation of set level with respect to time respectively. It must be noticed that the set level substantially lowered as described above is such that no releasing signal is generated for a usual slow braking operation which needs not prevention of skidding or when condition of track is good and wheels are not completely locked.

In the next place, when a deceleration-signal is considerably large but the voltage-divided deceleration-signal does not reach the set level at the first stage, i.e. actual set level in the setting circuit II, the transistors 129, 130 of the resetting circuit VI are together interrupted simultaneously with a braking operation in the same way as described above. In this case, since no switching signal is introduced into the switching circuit V, the capacitor 119 is charged only through the diode 117 and resistance 118. By selecting suitably the time-constant determined by the resistance 118 and condenser 119, capacitor 119 is fully charged in a suitable time period until it begins finally discharging through the resistance 120 and transistor 123 thereby to render said transistor 123 conductive while simultaneously interrupting the transitor 124. Interruption of the transistor 124 eliminates the resistance 125 from the voltage-dividing circuit. Consequently, a deceleration signal from the detection circuit 1 passes through the resistance 101 into the setting circuit II as it is without being voltage-divided by the resistances 101, 125. This establishes substantially a state in which the set level has been lowered. Thus, the settling circuit II is operated to generate a releasing signal thereby to release braking system, and thereafter the cycle of braking and releasing thereof is repeated until the vehicle stops.

The above described state of operation is clearly shown in Fig. 5(B), wherein curve $E_2$ shows vehicle velocity, curve $F_2$ wheel velocity, curve $A_2$ deceleration and acceleration of wheels, and curve $C_2$ variation of set level in function of time respectively.

Then, when brake-pedal is released from pushing effort after complete stoppage of vehicle, the switch 116 opens thereby to render the transistor 129, 130 of the resetting circuit VI conductive while simultaneously stopping charging of the capacitor 119, whereby the capacitor 119 is completely discharged through the transistor 79. The transistor 123 of the switching circuit V is thus resetted to non-conductive state while the transistor 124 of the same circuit V is resetted to conductive state respectively, whereby a voltage-dividing circuit consisting of the resistances 101, 125 is formed again thereby to raise the set level of the setting circuit II for a deceleration signal at the first stage. Thus the device is prepared for the following cycle of braking operation.

As described above, according to the invention, since the set level for detecting deceleration electric signal is high at the first state of braking operation, and when a deceleration signal exceeding said high set level has been once detected, the set level is lowered so as to detect even a small deceleration signal to cause the releasing means to operate, or since, even though a deceleration signal in the first stage of braking operation is lower than the set level, then this set level is lowered automatically in a certain time period thereby to detect even a low deceleration signal to cause the releasing means to operate, this device operates such that, when a slow braking operation accompanying no danger of skidding is carried out at first, the releasing means does not operate and a usual braking operation can be carried out smoothly, and when a rapid braking operation showing a momentary effect is carried out, the releasing means is caused to operate positively until the vehicle stops completely thereby to prevent skidding thereof not only in the case when a deceleration signal generated by said braking operation is sufficiently large but also in the case when said signal is relatively small. Thus in the device according to the invention, disadvantages encountered in the heretofore known devices are eliminated and the desired purposes can be attained.

Further, it is noted that this invention is not limited to the above described embodiments and these embodiments can be modified in the scope of the invention, for example, by using relay-combination circuits as switching circuit V and resetting circuit VI, by switching amplification ratios between the first detection of deceleration and the second detection thereof in place of using the voltage-dividing circuit of further by varying the sensitivity of deceleration detector in detection circuit 1 between the first detection of deceleration and the second one.

We claim:

1. In a brake control device of the type comprising a braking means, a brake control means, conversion means adapted to convert angular deceleration of the wheels caused by application of braking force into an electrical signal, a detector means for detecting deviation of said electrical signal from a predetermined reference value, said detector means being coupled with said brake control means such that upon detection of said deviation of said electrical signal, said brake control means is operated to cause release of the braking for an appropriate period of time and upon rerotation of the wheels braking force is reapplied and whereby application and release of the braking force are repeated, the improvement comprising, in combination:

first circuit means comprising an element for electrically detecting angular deceleration of the wheel to be braked and for generating a control signal upon deviation of said angular deceleration above a predetermined reference value;

second circuit means electrically connected to said first circuit means and comprising an element responsive to said control signal of said first circuit means to produce a pulse releasing signal effecting release of said brake control means; and third circuit means comprising an element responsive to said angular deceleration to decrease said reference value after generation of said control signal by said first circuit means, said pulse releasing signal of said second circuit means being made responsive to said decreased referenced value.

2. A brake control device as defined in claim 1, wherein said third circuit means comprises means for resetting the device in response to a signal representative of termination of brake release.

3. A brake control device as defined in claim 1, in which said first circuit means comprises an amplifying means for amplifying the signal representative of the detected angular deceleration, said third circuit being coupled with said amplifying means and varying the amplification degree of said amplifying means in response to said pulse signal to decrease the predetermined referenced value.

4. A brake control device as defined in claim 1, in which said first circuit means comprises a gate means, and wherein said third circuit means is coupled with said gate means and varies a bias potential of said gate means in response to said pulse signal to decrease said predetermined reference value.

5. A brake control device as defined in claim 1, in which said first circuit means comprises a generator for converting rotation of the wheels into an electrical signal, said generator producing an input signal representative of the angular deceleration of the wheels.

6. A brake control device as defined in claim 1, wherein said third circuit means comprises a means for generating a signal after a predetermined period of time from commencement of braking when angular deceleration at the braking commencement is less than a predetermined value, the means for decreasing said predetermined value being operated in response to said generated signal.

7. A brake control device as defined in claim 6, wherein said third circuit means comprises means for resetting the device in response to the signal representative of termination of braking release.

* * * * *

UNITED STATES PATENT OFFICE
CERTIFICATE OF CORRECTION

Patent No. 3,652,133　　　　　　　Dated March 28, 1972

Inventor(s) Toshio Yamazaki et al.

It is certified that error appears in the above-identified patent and that said Letters Patent are hereby corrected as shown below:

On the title page, Item "]73]" should read as follows

-- Assigneees:　Sharp Kabushiki Kaisha,
　　　　　　　　Osaka-Shi, Osaka-Fu, Japan
　　　　　　　　and Aisin Seiki Kabushiki
　　　　　　　　Kaisha, Kariya-Shi, Aichi-Ken, Japan --.

Signed and sealed this 27th day of February 1973.

(SEAL)
Attest:

EDWARD M. FLETCHER, JR.　　　　　　ROBERT GOTTSCHALK
Attesting Officer　　　　　　　　　Commissioner of Patents